United States Patent [19]

Fujiwara

[11] Patent Number: 4,545,449
[45] Date of Patent: Oct. 8, 1985

[54] POWER STEERING SYSTEM WITH ENGINE IDLING-UP MECHANISM

[75] Inventor: Hidetoshi Fujiwara, Okazaki, Japan

[73] Assignee: Toyoda Koki Kabushiki Kaisha, Kariya, Japan

[21] Appl. No.: 655,459

[22] Filed: Sep. 28, 1984

[30] Foreign Application Priority Data

Sep. 30, 1983 [JP] Japan ................. 58-184233

[51] Int. Cl.⁴ ........................................ B62D 5/06
[52] U.S. Cl. ................................. 180/69.3; 123/339
[58] Field of Search ................ 180/69.3, 141, 142, 180/132; 123/339, 340

[56] References Cited

U.S. PATENT DOCUMENTS

| | | | |
|---|---|---|---|
| 3,196,972 | 7/1965 | Perrin | 180/69.3 |
| 4,225,003 | 9/1980 | Yoshimura | 180/69.3 |

FOREIGN PATENT DOCUMENTS

| | | | |
|---|---|---|---|
| 0008332 | 1/1982 | Japan | 123/339 |
| 57-61147 | 4/1982 | Japan . | |
| 0104339 | 6/1983 | Japan | 123/339 |

*Primary Examiner*—Harry Tanner
*Attorney, Agent, or Firm*—Oblon, Fisher, Spivak, McClelland & Maier

[57] ABSTRACT

A power steering system for motor vehicles, which is provided with first and second engine idling-up means for raising the rotational speed of an engine by increasing the quantity of air-fuel mixture to be supplied to the engine. The first idling-up means is arranged to be actuated in response to an increase of discharge pressure of an oil pump. The idling-up mechanism further includes a position detecting means which is arranged to produce an output signal for actuating the second idling-up means upon detection of approach to the stroke end of the piston in the power cylinder.

4 Claims, 4 Drawing Figures

POWER STEERING SYSTEM WITH ENGINE IDLING-UP MECHANISM

BACKGROUND OF THE INVENTION

1. Field of the Invention

This invention relates to a power steering system with an engine idling-up mechanism for increasing the idling rotational speed of an engine in response to operation of the power steering system.

2. Description of the Prior Art

In the case of motor vehicles with a power steering system, it is necessary to provide means for preventing knocking or engine stops due to a drop of the engine speed caused by an increase of engine load during operation of the power steering system. For this purpose, it has been the conventional practice to provide, in an oil conduit interconnecting a power steering system 1 and a hydraulic pump 2, an air control valve as shown in FIG. 1, which is actuated in response to a pressure increase resulting from operation of the power steering system 1. Besides, there is provided a negative pressure actuator valve 6 which increases the open area of the throttle valve 5 of the carburetor. A rear chamber 6a of the negative pressure actuator 6 is communicated with the intake manifold 7a of an engine 7 on the downstream side of the throttle valve 5 through the air control valve 3, thereby increasing the open rate of the throttle valve 5 during operation of the power steering system to raise the engine output.

However, a difficulty is encountered in promptly increasing the engine output due to delays in operation of the negative pressure actuator 6 and engine 7. When a steering wheel is turned from a center position, the engine output can be increased in time as long as the increase of pump load resulting from operation of the power steering system 1 is smooth. In the event steering operation is once paused when a piston 9 of a power cylinder 8 is in the proximity of its stroke end, it becomes difficult to increase the engine output in time upon recommencement of the turning effort on the steering wheel which moves the power piston 9 to the stroke end, as a result causing knocking or an engine stop.

This is because, once the turning effort on the steering wheel is stopped, it puts the power steering system 1 in non-operating state, cancelling the idling-up of the engine 7. Accordingly, even if the air control valve 3 is actuated in response to the recommencement of the steering operation, it is often the case that the power piston 9 reaches the stroke end and increases the pump load before completing the boosting of the engine output, inviting instabilization of the engine rotation or an engine stop due to a drop of its rotational speed.

SUMMARY OF THE INVENTION

It is therefore an object of the present invention to provide an improved power steering system which is provided with means for preventing engine stops or instabilization of engine rotation as caused by an abrupt increase of engine load when a power piston of the power cylinder is in a stroke end range or in a position in the proximity of its stroke end.

According to the invention, there is provided a power steering system which is provided with first and second idling-up means for raising the rotational speed of an engine by increasing the supply air-fuel mixture to the engine. The first idling-up means is arranged to be actuated in response to an increase of discharge pressure of an oil pump. The idling-up mechanism further includes a position detecting means which, upon detection of approach to the stroke end of the power piston in the power cylinder, produces an output to actuate the second idling-up means.

With this arrangement, in a case where the power piston in the stroke end range is moved to the stroke end by an abrupt turning effort on the steering wheel, the second idling-up means is put in operation, promptly increasing the rotational speed of the engine to prevent instabilization of engine rotation or an engine stop which would otherwise be brought about by an increased pump load.

The above and other objects, features and advantages of the invention will become apparent from the following description and appended claims, taken in conjunction with the accompanying drawings which show by way of example some preferred embodiment of the invention.

BRIEF DESCRIPTION OF THE DRAWINGS

In the accompanying drawings

DESCRIPTION OF PREFERRED EMBODIMENTS

Figure 2:
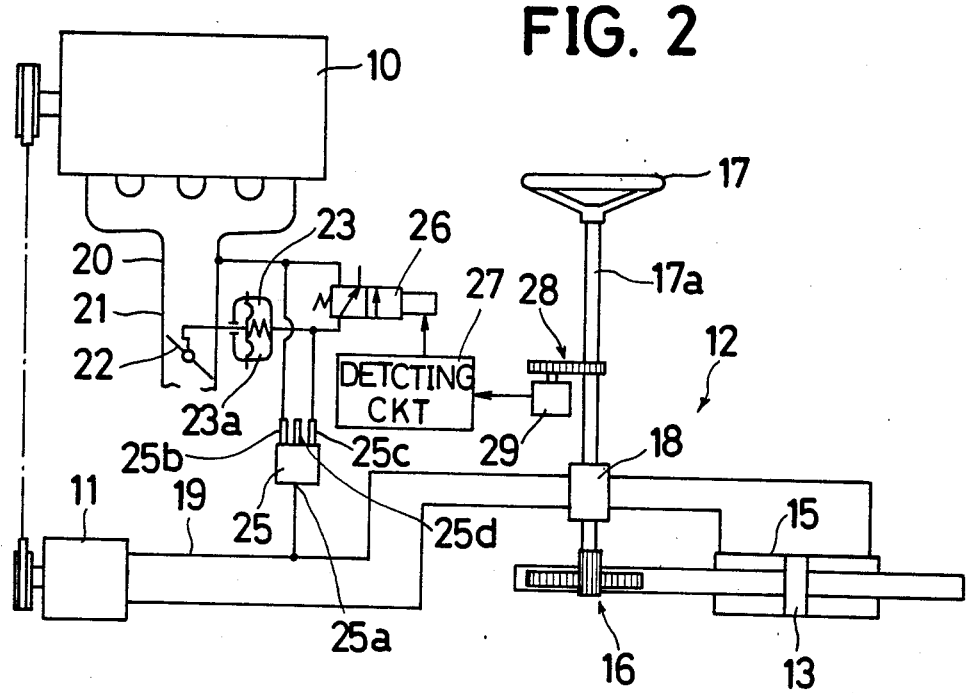
FIG. 2 is a schematic illustration of a power steering system incorporating an engine idling-up mechanism according to the present invention.

Referring to FIG. 2, there is illustrated a power steering system incorporating an engine idling-up mechanism according to the invention, in which indicated at 10 is an engine, at 11 a hydraulic pump which is driven by the engine 10, and at 12 a power steering system which is operated by the hydraulic pressure delivered from the pump 11. The power steering system 12 includes a power cylinder 15 with a power piston 13 connected to the steering mechanism of a vehicle, and a servo valve mechanism 18 linked to the power piston 13 through a rack-pinion mechanism 16 and having its input shaft coupled with a steering wheel 17. The fluid pressure delivered from the pump 11 is supplied to the servo valve mechanism 18 through conduit 19. When the steering wheel 17 is not turned, the fluid pressure from the pump 11 is returned directly to a reservoir. Upon turning the steering wheel 17, the fluid pressure is fed either to a left or right chamber of the power cylinder 15 depending upon the steering direction to move the power piston accordingly.

Turning now to the engine idling-up mechanism, a carburetor 21 which is connected to the engine 10 through an intake manifold 20 is provided with a throttle valve 22. Connected to the throttle valve 22 is a negative pressure actuator 23 which is adapted to turn the throttle valve 22 in the valve opening direction when vacuum is developed in its rear chamber 23a. This rear chamber 23a of the negative pressure actuator 23 is communicated with the intake manifold 20 through parallel circuits containing an air control valve 25 and an electromagnetic change-over valve 26, respectively.

Figure 3:
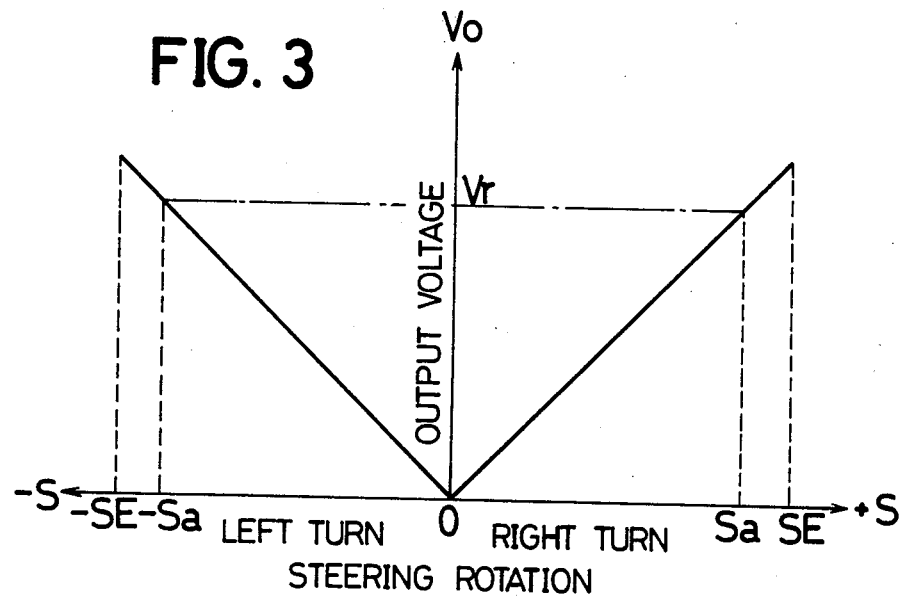
FIG. 3 is a diagram showing the output of a position detector employed in the engine idling-up mechanism of FIG. 2.
Figure 4:
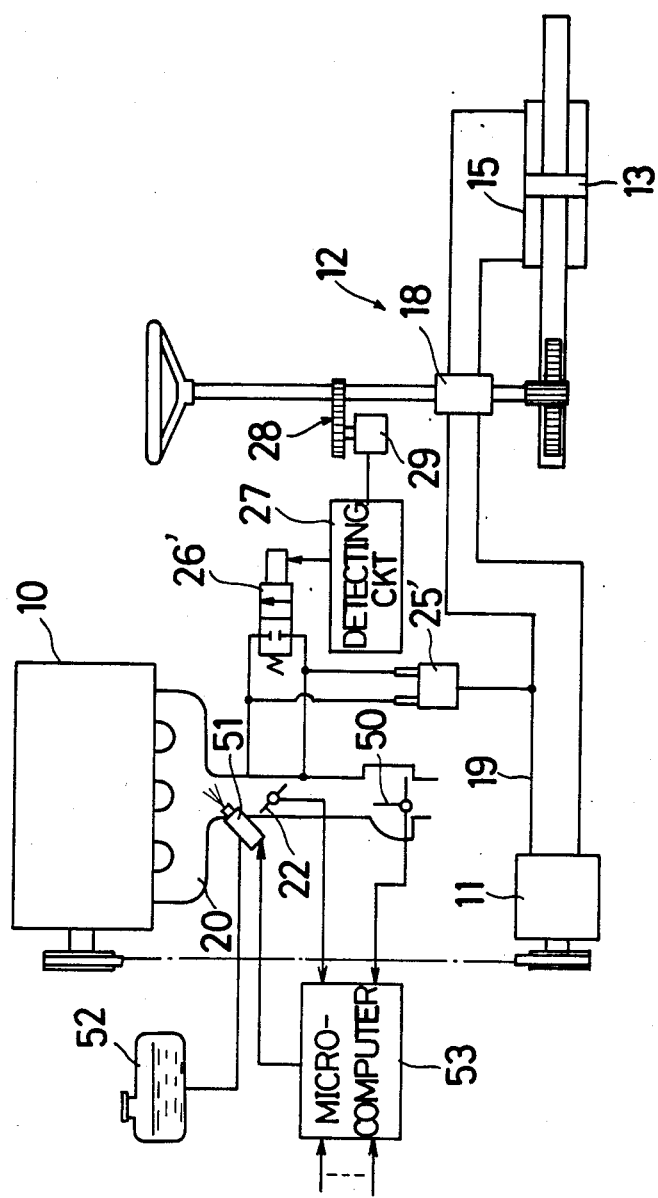
FIG. 4 is a view similar to FIG. 2 but showing another embodiment of the engine idling-up mechanism according to the invention.

The above-mentioned air control valve 25 is of the type as shown in FIGS. 3 and 4 of Laid-Open Japanese Utility Model Application No. 56-8984. The air control valve 25 has its fluid inlet port 25a connected to the conduit 19 at a point between the oil pump 11 and power cylinder 15. If the discharge pressure of the pump 11 is increased by operation of the steering wheel 17, the spool (not shown) in the air control valve 25 is shifted to communicate ports 25c and 25b with each other, thereby communicating the rear chamber 23a of the negative pressure actuator 23 with the intake manifold 20. As a result, the diaphragm (not shown) of the negative pressure actuator 23 is moved toward the rear chamber 23a against the action of a compression spring (not shown), turning the throttle valve 22 in the opening direction to increase the output of the engine.

On the other hand, should the discharge pressure of the oil pump 11 drop, the spool (not shown) is shifted to communicate the port 25c with port 25d which is opened to the atmosphere, restoring the atmospheric pressure in the rear chamber 23a of the negative pressure actuator 23. Consequently, the throttle valve 22 is turned in the closing direction by the action of the spring to put the engine in normal idling state.

The electromagnetic change-over valve 26 is actuated by the output of a position detecting circuit 27 which detects the position of the power piston 13 by way of the rotational angle of the steering wheel 17. The position detecting circuit 27 is adapted to detect the position of the power piston 13 indirectly from the output of a position detector 29 constituted, for example, by a potentiometer connected through a gear mechanism 28 to a steering shaft 17a which is integrally connected to the steering wheel 17. As soon as the power piston 13 is moved into a position within a predetermined range from its stroke end, the position detector 29 produces an output signal. More particularly, as shown in FIG. 3, the output of the position detector 29 is zero when the power piston 13 (or the steering wheel 17) is at the center position, and increases in proportion to the movement of the power piston 13 from the center position caused by operation of the steering wheel 17. When the output of the position detector 29 exceeds a predetermined value Vr, the piston position detecting circuit 27 produces the output signal by detecting the power piston 13 reaching an idling-up position Sa or -Sa which is at a predetermined distance from the stroke end SE or -SE. By this output signal of the piston position detecting circuit 27, the solenoid of the electromagnetic changeover valve 26 is energized to communicate the rear chamber 23a of the negative pressure actuator 23 with the intake manifold 20. As a result, the supply of air-fuel mixture to the engine 10 is increased to boost the engine output. If the power piston 13 at the idling-up position is returned to the center position and the solenoid of the electromagnetic valve 26 is deenergized, the rear chamber 23a of the negative pressure actuator 23 is communicated with the atmosphere to cancel the idling-up.

With the engine idling-up mechanism of the above-described construction, if the steering wheel 17 is turned when the power piston 13 is in or in the vicinity of the center position, the air control valve 25 is actuated by the increase in the discharge pressure of the pump 11, thereby raising the idling rotational speed of the engine 10 to increase its output.

On the other hand, when the power piston 13 reaches an idling-up position Sa or -Sa which is within a predetermined range from the stroke end SE or -SE, the piston position detecting circuit 27 produces an output signal to actuate the electromagnetic change-over valve 26 for idling-up of the engine 10. Accordingly, in case the steering wheel 17 is abruptly turned after a pause of the steering effort on the steering wheel in that state, the power piston is moved to the stroke end but instabilization of the engine rotation or engine stop is suitably prevented in spite of an abrupt increase of the load of the pump 11, namely, an increase of the engine load.

If desired, arrangements may be made to actuate the electromagnetic change-over valve 26 upon detection of the increase of the discharge pressure of the oil pump 11 by a semi-conductor pressure sensor.

Figure 1:
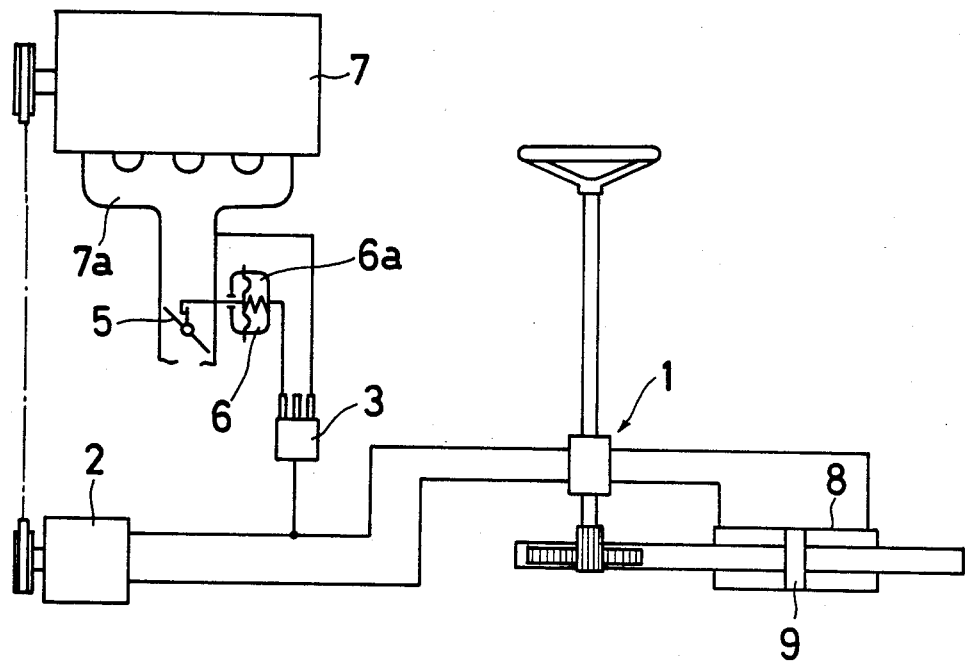
FIG. 1 is a schematic illustration of a conventional power steering system with an engine idling-up mechanism.

Further, although the throttle valve 22 in the carburetor 21 is turned by the negative pressure actuator 23 to increase the supply of air-fuel mixture to the engine 10 in the foregoing embodiment, it is to be understood that the present invention is not limited to such an arrangement. For example, in the case of an engine with an electronically controlled fuel injector, the upstream and downstream sides of the throttle valve 22 are bypassed by parallel circuits constituted by an air control valve 25' and an electromagnetic on-off valve as shown in FIG. 4. In this instance, the air control valve 25' is preferred to be of the construction as shown in FIG. 1 of Laid-Open Japanese Utility Model Application No. 56-8984. In FIG. 4, denoted at 50 is a flow meter, and at 51 a fuel injector for injecting gasoline, which is supplied from a fuel tank 52, into the intake manifold 20 at a position on the downstream side of the throttle valve 22. The length of injection periods of the fuel injector 51 is controlled by a micro-computer 53 according to the output of the flow meter and the open rate of the throttle valve 22 or based on other input data.

Needless to say, the present invention is applicable also to recirculating-ball type power steering systems.

Obviously, numerous modifications and variations of the present invention are possible in light of the above teachings. It is therefore to be understood that within the scope of the appended claims, the present invention may be practiced otherwise than as specifically described herein.

What is claimed is:

1. A power steering system for motor vehicles capable of controlling the rotational speed of an engine by varying the quantity of air-fuel mixture to be supplied to the engine from a fuel feed means, said power steering system comprising:
   a hydraulic pump driven from said engine;
   a power cylinder;
   a servo valve mechanism driven from a steering wheel and controlling distribution of pressurized fluid from said hydraulic pump to a couple of chambers in said power cylinder;
   first idling-up means for increasing the quantity of air-fuel mixture to be supplied to said engine in response to increases of discharge pressure of said hydraulic pump to raise the rotational speed of said engine; and
   second idling-up means for increasing the quantity of air-fuel mixture to be supplied to said engine to increase the rotational speed of said engine when a piston of said power piston reaches a position in a stroke end range.

2. A power steering system as set forth in claim 1, wherein said fuel feed means includes a carburetor and an intake manifold for conducting air-fuel mixture from said carburetor to said engine, and said first idling-up means comprises:
- a negative pressure actuator operable in response to negative pressure to increase the open rate of a throttle valve of said carburetor;
- an air control valve connected to said intake manifold and negative pressure actuator and adapted to conduct negative pressure developed in said intake manifold into said negative pressure actuator in response to increases of the discharge pressure of said hydraulic pump; and said second idling-up means comprises:
- position detecting means adapted to produce a signal when the piston of said power cylinder reaches a position in said stroke end range; and
- an electromagnetic valve connected to said intake manifold and negative pressure actuator in parallel relation with said air control valve and adapted to conduct negative pressure developed in said intake manifold into said negative pressure actuator in response to a signal from said position detecting means.

3. A power steering system as set forth in claim 2, wherein said position detecting means is arranged to detect arrival of the piston of said power cylinder at said stroke end range by way of rotational angle of said steering wheel.

4. A power steering system as set forth in claim 1, wherein said fuel feed means includes an intake manifold, a throttle valve for controlling air flows to said intake manifold and a fuel injector for injecting a fuel into a combustion chamber of said engine, and said first idling-up means comprises,
- an air control valve connected to upstream and downstream portions of said intake manifold divided by said throttle valve and arranged to short-circuit said upstream portion to said downstream portion in response to increase of the discharge pressure of said hydraulic pump; and said second idling-up means comprises,
- a position detecting means adapted to produce a signal when the piston of said power cylinder reaches said stroke end range; and
- an electromagnetic valve connected to the upstream and downstream portions of said intake manifold in parallel relation with said air control valve, and adapted to short-circuit said upstream portion to said downstream portion of said intake manifold in response to a signal from said position detecting means.

* * * * *